United States Patent
Cress et al.

(10) Patent No.: US 10,225,009 B2
(45) Date of Patent: Mar. 5, 2019

(54) BROADBAND ACCESS DEVICES HAVING A RADIO LINK

(71) Applicant: Adtran, Inc., Huntsville, AL (US)

(72) Inventors: Jared Cress, Huntsville, AL (US); Ronan A. Kelly, Dublin (IE); Kevin W. Schneider, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 105 days.

(21) Appl. No.: 15/200,862

(22) Filed: Jul. 1, 2016

(65) Prior Publication Data
US 2018/0006719 A1    Jan. 4, 2018

(51) Int. Cl.
*H04B 10/08*    (2006.01)
*H04B 10/079*   (2013.01)
(Continued)

(52) U.S. Cl.
CPC ..... *H04B 10/07955* (2013.01); *H04B 10/071* (2013.01); *H04B 10/25752* (2013.01); *H04B 10/27* (2013.01); *H04B 10/40* (2013.01); *H04J 14/0227* (2013.01); *H04L 41/04* (2013.01); *H04L 43/08* (2013.01); *H04L 43/10* (2013.01);
(Continued)

(58) Field of Classification Search
CPC ............ H04B 10/07955; H04B 10/071; H04B 10/25752; H04B 10/27; H04B 10/40; H04B 10/272; H04B 10/0771; H04B 10/0791; H04B 10/0799; H04B 10/2575; H04B 10/03; H04B 10/0793; H04B 10/0773; H04Q 2011/0081; H04Q 2011/0086; H04Q 2011/0083; H04Q 11/0067; H04Q 2011/0079; H04Q 11/0062; H04Q 11/0071; H04J 14/0252; H04J 14/0227; H04J 3/14;
(Continued)

(56) References Cited

U.S. PATENT DOCUMENTS

| | | | |
|---|---|---|---|
| 8,787,751 B2 * | 7/2014 | Shaffer | H04B 10/0773 398/17 |
| 8,938,166 B2 * | 1/2015 | Roullot | H04B 10/40 398/135 |
| 8,948,595 B2 * | 2/2015 | Kazawa | H04B 10/27 398/154 |
| 9,407,358 B2 * | 8/2016 | Kim | H04B 10/03 |

(Continued)

FOREIGN PATENT DOCUMENTS

WO    WO 2015101764 A1 *   7/2015   ............ H04M 19/08

OTHER PUBLICATIONS

International Search Report and Written Opinion issued in International Application No. PCT/US2017/040582, dated Sep. 7, 2017, 12 pages.

*Primary Examiner* — Hibret A Woldekidan
(74) *Attorney, Agent, or Firm* — Fish & Richardson P.C.

(57) ABSTRACT

Methods, systems, and apparatus for communicating over a radio link by devices with broadband connectivity are disclosed. In one aspect, a telecommunications device includes a first transceiver, a second transceiver, and a state monitor. The first transceiver communicates over a broadband link. The second transceiver communicates over a radio link. The radio link is a Low-Power Wide-Area Network (LPWAN) link. The state monitor includes one or more processes that monitor a state of the telecommunications device, and in response to the state of the telecommunications device being one of a plurality of pre-specified states, transmit, using the second transceiver, data specifying the state of the telecommunications device over the radio link.

22 Claims, 5 Drawing Sheets

(51) Int. Cl.
  *H04B 10/071*  (2013.01)
  *H04B 10/2575*  (2013.01)
  *H04B 10/27*  (2013.01)
  *H04B 10/40*  (2013.01)
  *H04L 12/24*  (2006.01)
  *H04L 12/26*  (2006.01)
  *H04J 14/02*  (2006.01)
  *H04L 29/06*  (2006.01)
  *H04Q 11/00*  (2006.01)
  *H04W 12/12*  (2009.01)

(52) U.S. Cl.
  CPC ..... *H04L 63/1483* (2013.01); *H04Q 11/0067* (2013.01); *H04W 12/12* (2013.01); *Y02D 70/00* (2018.01)

(58) Field of Classification Search
  CPC ........ H04J 3/1694; H04L 41/04; H04L 43/08; H04L 43/10; H04L 63/1483; Y02D 70/00
  USPC ......... 398/21, 25, 38, 66, 67, 115, 116, 135, 398/138, 139, 17, 22
  See application file for complete search history.

(56) References Cited

U.S. PATENT DOCUMENTS

| | | | |
|---|---|---|---|
| 9,596,031 B2* | 3/2017 | Soto | H04L 12/2898 |
| 2007/0103670 A1* | 5/2007 | Sezerman | G01M 11/3109 |
| | | | 356/73.1 |
| 2008/0138064 A1* | 6/2008 | O'Byrne | H04B 10/0793 |
| | | | 398/25 |
| 2009/0129773 A1* | 5/2009 | Oron | H04B 10/0793 |
| | | | 398/10 |
| 2012/0243871 A1 | 9/2012 | Huang et al. | |
| 2013/0257623 A1* | 10/2013 | Bagasra | G08B 27/005 |
| | | | 340/657 |
| 2014/0056582 A1* | 2/2014 | Roberts | H04B 10/07955 |
| | | | 398/20 |
| 2015/0003822 A1 | 1/2015 | Fukada et al. | |
| 2015/0009842 A1* | 1/2015 | Trojer | H04L 12/10 |
| | | | 370/252 |
| 2015/0009846 A1* | 1/2015 | Gacanin | H04B 17/00 |
| | | | 370/252 |
| 2015/0230169 A1* | 8/2015 | Hood | H04W 52/0216 |
| | | | 370/311 |
| 2016/0330334 A1* | 11/2016 | Cooper | H04M 19/08 |

\* cited by examiner

BROADBAND ACCESS DEVICES HAVING A RADIO LINK

BACKGROUND

This specification relates to devices with broadband connectivity.

In a telecommunication network, devices with a broadband connection (e.g., Digital Subscriber Line (DSL), Passive Optical Network (PON)) use a broadband channel for high-speed data communications. A management channel can be embedded in the broadband channel.

SUMMARY

In general, one innovative aspect of the subject matter described in this specification can be embodied in methods for transmitting data over a radio channel, such as a Low-Power Wide-Area Network (LPWAN) channel, by devices with broadband connectivity. One example computer-implemented method includes the following: monitoring, by a first telecommunications device comprising a transceiver configured to communicate over a broadband link, a state of the first telecommunications device; determining, by the first telecommunications device, that the state of the first telecommunications device matches one of a plurality of pre-specified states; and in response to the determination, transmitting, by the first telecommunications device and over a radio link, data specifying the state of the first telecommunications device.

These and other embodiments can each optionally include one or more of the following features. The plurality of pre-specified states include at least one of a power outage at the first telecommunications device, unexpected traffic pattern on the broadband link, impeded communication over the broadband link, or polled by a second telecommunications device over the radio link. The transmitted data over the radio link comprises at least one of diagnostic information, performance monitoring information, troubleshooting information, maintenance information, inventory information, information associated with the broadband link, or self-installation capability for the first telecommunications device. The broadband link is a fiber-optic link and the radio link is a LPWAN link. The first telecommunications device is a reverse powered device that obtains power from a customer premises.

Methods can further include monitoring DC power that the first telecommunications device is drawing from a power feed unit that is external to the first telecommunications device, and transmitting data specifying the DC power over the radio link to the power feed unit.

Methods can further include powering at least a portion of the first telecommunications device with a battery installed in the first telecommunications device when the first telecommunications device is not supplied with external power.

In some implementations, the first telecommunications device is an Optical Network Unit (ONU) on a Passive Optical Network (PON), and the ONU communicates with an Optical Line Termination (OLT) on the PON over the broadband link. Methods can further include the following: performing, by the ONU, an Optical Time-Domain Reflectometer (OTDR) measurement of fiber connected between the ONU and the OLT or a splitter, and transmitting, by the ONU and over the radio link, the OTDR measurement.

Particular embodiments of the subject matter described in this specification can be implemented so as to realize one or more of the following advantages. The combination of the broadband data connection with a radio channel (e.g. a low bit-rate LPWAN channel) can provide enhanced capabilities. For reverse powered devices (e.g., GFast DPUs deployed at a Distribution Point) that communicate over a broadband network, adding additional LPWAN connectivity (or another radio channel) to these devices provides operational troubleshooting, maintenance, and inventory capabilities that operates independently relative to the broadband network, and may be utilized even when communications over the broadband network are impeded. For example, when reverse power is not being supplied to a reverse power device from the customer premises, LPWAN communication with the device at a Distribution Point allows for inventory reporting and/or tracking to be carried out using the LPWAN so that the operator does not lose track of equipment in the field. For a Passive Optical Network (PON), additional LPWAN connectivity (or another radio channel) provides more robust troubleshooting techniques. For example, adding additional LPWAN connectivity to Optical Network Units (ONUs) enables ONUs to perform ONU-based Optical Time-Domain Reflectometer (OTDR) measurements and communicate the OTDR measurement over the LPWAN link for detecting a location of a fault on the fiber link. Furthermore, the additional LPWAN connectivity can enable self-install capabilities for residential customer-premises equipment (CPE) devices.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
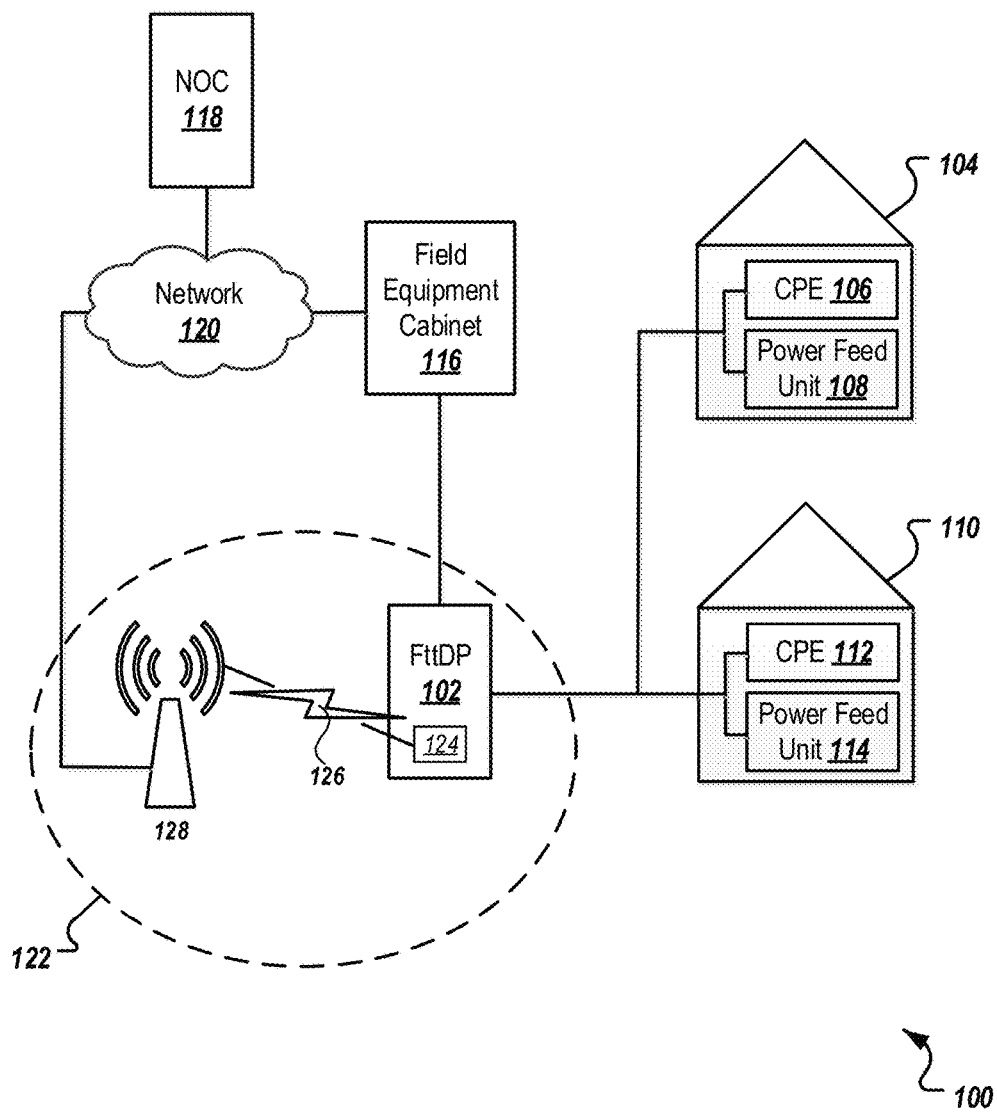
FIG. 1 is a block diagram illustrating an example operating environment for devices having broadband connectivity and a radio link.

The present disclosure describes methods, systems, and apparatus for communicating over a radio link by devices with broadband connectivity. For example, a telecommunications device can include a first transceiver, a second transceiver, and a state monitor. The first transceiver can communicate over a broadband link, while the second transceiver can communicate over a radio link. The state monitor can include one or more processes (e.g., hardware or software based processes) that monitor a state of the telecommunications device. In response to the state of the telecommunications device being one of a plurality of pre-specified states, the telecommunications device can transmit, using the second transceiver, data specifying the state of the telecommunications device over the radio link.

Although this disclosure refers to optical telecommunications systems for purposes of example, the subject matter of this document can be applied to other types of telecommunications systems or other systems that transmit digital data. Additionally, a LPWAN link will be referred to as an example radio link, but other types of radio links can also be used.

In a telecommunication network, devices with a broadband connection use a broadband channel for high-speed data communications. A management channel is typically embedded in the broadband channel since it consumes little bandwidth. However, when the broadband connection is down (e.g., communication over the broadband channel is disrupted) the embedded management channel is also down. As such, adding an alternative communication channel (i.e., a radio link), independent from the broadband channel, to the remote devices could be useful. Various forms of wireless LPWAN connectivity are becoming available (e.g. SigFox, NB-LTE, LoRa), and these can be used to implement the radio link. By integrating a LPWAN radio powered by a small battery into the remote broadband access devices, new inventory, troubleshooting, maintenance capabilities can be provided.

The disclosed subject matter addresses problems that arise when certain classes of fixed access communication equipment find themselves without a way to communicate. This lack of communication creates operational challenges for the service provider, for example, by making it difficult to determine why they cannot communicate with deployed communications equipment (e.g., due to network outage or unit specific issues), making it more difficult to pinpoint a location of a network outage, and/or to update configurations of deployed communications equipment.

There are various situations in which service providers are unable to communicate with deployed communications equipment. In one example, reverse powered devices are incommunicable when reverse power is not supplied from the customer premises (e.g., when the first customer has yet to be turned up or when commercial AC power is lost at the premises). When reverse power is unavailable, the operator is unable to collect basic inventory, troubleshooting, and/or maintenance information from the reverse powered devices over the management channel that is embedded in the broadband channel.

In another example, when a PON data path link is down, a healthy ONU cannot communicate over the broadband channel. This might occur, for example, when there is a failure on the OLT electronics, there is a power outage at the premises where the ONU is located, there is a rogue ONU on the PON, and/or the fiber link is damaged. In these situations, having a radio channel to the ONU could be useful in isolating and identifying the problem.

In a third example, when turning up a new broadband service (e.g. fiber to the premises (FTTP)), a technician may need to enter the premises to install the CPE. As such, it may be desirable to split the CPE functionality into an external unit that the technician can install without entering the premises and an in-house unit that the customer can install. The in-house unit generally feeds power to the external unit. In some situations, the power feeding is done over twisted pair conductors, and alternative arrangements for plain old telephone service (POTS) must be made to ensure that the power transmitted over the twisted pair does not damage devices connected to the twisted pair. Having a communication channel between indoor unit and outdoor unit can help ensure that, for example, by facilitating communication of expected power draw over the twisted pair. In some implementations, LPWAN connectivity can be used to implement this communications channel.

In the present disclosure, integrating a LPWAN radio powered by a small battery into the remote broadband access devices provides a radio link over which a range of inventory, troubleshooting, and/or maintenance capabilities can be implemented.

In some implementations, LPWAN communication with an unpowered device at a Distribution Point allows for inventory tracking so that the operator doesn't lose track of an installed base of equipment in the field. For example, equipment may be installed in a yet to be built neighborhood or commercial development, and it may be months or years before some (or all) of the installed equipment is actually able to communicate over a broadband channel. During this time, a radio link can be used to keep track of that equipment and/or to bring the equipment up for the first time (e.g., by communicating configuration data over the radio link).

Providing a radio link also allows for troubleshooting and alarms. For example, providing a radio link enables the ability to determine whether the Distribution Point device has been powered up before, whether a handshake attempt has been made at the reverse powering device, where in the handshake the abort occurs if the handshake fails, whether the voltages and currents reach the Distribution Point within the expected range, and/or which end is aborting. Furthermore, an additional radio link (e.g., a LPWAN link) to the CPE device allows the fault to be isolated appropriately. For example, providing an additional radio link enables the ability to determine whether proper AC power is being fed into the CPE, what voltages and currents are being applied to the loop, whether the impedance looking into the loop is correct or a short is being seen, and/or where the handshake is aborting.

In some implementations, adding LPWAN connectivity can facilitate implementation of troubleshooting techniques in a PON and the ability to obtain diagnostic information. For example, ONUs can report unexpected behavior or traffic patterns from a failed OLT. ONUs can report power outages as their reason from disconnecting from the PON when polled by a service provider over the LPWAN channel. In addition, a rogue ONU (e.g., an ONU that is operating outside of its assigned timeslot) can be isolated and dealt with. For example, victim ONUs that are interfered by a rogue ONU can report, over the LPWAN channel, that they are indeed transmitting in their assigned timeslot when polled over the LPWAN channel. An ONU that fails to respond to polling commands (or reports that it is transmitting outside its assigned timeslot) can be identified as a rogue ONU. Thus, a service provider can transmit an Emergency Shutdown command over the LPWAN channel to shutdown (or reset) the rogue ONU. In some implementations, OTDR capabilities can be enhanced, for example, by enabling ONU-based OTDR measurements to be remotely obtained, thereby providing a more detailed view of the fiber link than that provided by OLT-based OTDR measurements alone. OLT-based OTDR measurements are limited by dynamic range issues created by splitter loss, among other things. These issues can be addressed by using both the OLT-based and ONU-based OTDR measurements to obtain more information about the fiber link on both sides of the splitter. More specifically, with the addition of an LPWAN channel, each ONU can detect the distance to a fault in its distribution fiber (i.e., the fiber between the splitter and the ONU) using ONU-based OTDR measurements and report the findings over the LPWAN channel. Combining the ONU-based OTDR measurements with the OLT-based OTDR measurements, which detect distance to a fault in the feeder fiber (i.e., the fiber between the OLT and the splitter), fiber faults can be remotely detected irrespective of which side of the splitter they are located.

In some implementations, self-installation on an ONU applies both POTS and reverse powering to a single copper pair. Using one technique to keep the reverse powering unit from damaging an improperly connected phone, a method for the outdoor unit reporting its power draw to the indoor unit is needed. In some situations, instead of multiplexing a communication channel between the indoor unit and the outdoor unit onto the twisted pair, the communication channel can be accomplished with a low-power radio link (e.g., a LPWAN link) between the indoor and outdoor unit. Features and implementations of implementing a radio link in a device that communicates over a broadband link is described now with reference to the figures.

Turning to the illustrated implementation, FIG. 1 is a block diagram illustrating an example operating environment 100 for devices having broadband connectivity and a radio link. As illustrated in FIG. 1, the environment 100 includes a Fiber to the Distribution Point (FttDP) unit 102 that connects users to a network 120 through a field equipment 116 over a broadband link (e.g., a fiber-optic link between the field equipment 116 and the FttDP 102, a GFast link between the FttDP 102 and business location 110). The environment 100 also includes a network operations center (NOC) 118 that monitors, controls, and/or manages the FttDP unit 102 (or any other field equipment) via the network 120 and/or the LPWAN 122. The FttDP 102 data path uplink to the field equipment 116 may comprise an active Ethernet link, a PON link, or some other instantiation of a communication link. In some implementations, the environment 100 may include additional and/or different components not shown in the block diagram, such as another type of field equipment, another type of network that provides network services (e.g., ADSL2+, VDSL2), or a combination of these and other technologies. In some implementations, components may also be omitted from the environment 100.

As illustrated, the FttDP unit 102 is typically located relatively near the customer premises (e.g., residential location 104 and business location 110) and enables fiber communications to be extended to within a few hundred meters of the boundary of the customer premises. The FttDP unit 102, as a network distribution element, provides an interface between the CPEs (e.g., CPEs 106 and 112 inside residential location 104 and business location 110, respectively) and the network 120, and serves as the service provider's endpoint of the fiber-optic link, enabling the last hop to be cost-effectively served over existing copper infrastructure. The FttDP unit 102 terminates optical fiber transmission and can transform incoming optical signals into electrical signals suitable for the final drop to the subscriber devices. As a result, FttDP unit 102 can provide network services, for example, to residential location 104, to business location 110, or to any other location requiring communications infrastructure. The FttDP unit 102 transmits downstream data traffic to CPEs (e.g., CPEs 106 and 112), and receives upstream data traffic from the CPEs. In some implementations, the FttDP unit 102 is a reverse powered device and the power is supplied from the customer premises (e.g., power feed unit 108 inside residential location 104, and/or power feed unit 114 inside business location 110).

As illustrated, the FttDP unit 102 can communicate with the NOC 118 via network 120 through the field equipment 116. In addition, the FttDP unit 102 includes a LPWAN component (discussed in more detail in FIG. 4 below) that can communicate with the NOC 118 via the LPWAN 122. The LPWAN 122 includes a base station 128 that can communicate with the NOC 118 via network 120 over, for example, fixed wireline infrastructure (e.g., a radio backhaul link). In addition, the base station 128 can communicate with the FttDP unit 102 over a low-power radio link 126. In some implementations, the LPWAN 122 can include additional base stations, and/or other components not shown in FIG. 1. The LPWAN connection (e.g., a wireless communications link) between the NOC 118 and the FttDP unit 102 through the base station 128, independent from the broadband connection through the field equipment 116, provides the operator with various capabilities as discussed above (e.g., inventory, inquiring about startup handshakes, having a path for alarms) regardless of the status of the broadband connection and/or power issues at customer premises.

In some implementations, the FttDP unit 102 is a reverse powered device that obtains power from a customer premises (e.g., power feed unit 108). The FttDP unit 102 includes a state monitor 124 that monitors the reverse power supplied from the customer premises. In its normal operations, the FttDP unit 102 communicates with the NOC 118 or other endpoints over the broadband link when reverse power is supplied from the customer premises. When reverse power is unavailable (e.g., when the first customer has yet to be turned up or when commercial AC power is lost at the premises), the state monitor 124 transmits status information of the FttDP unit 102 (e.g., power outage at the customer premises) over the LPWAN connection to the NOC 118. The state monitor 124 is powered by a small battery in the FttDP unit 102, and can work while other components of the FttDP unit 102 (e.g., transceiver of the broadband link) cannot when reverse power is unavailable. In some implementations, the state monitor 124 can acquire and/or transmit status information of the FttDP unit 102 over the LPWAN connection in response to receiving a polling command (or other command) over the LPWAN connection. As such, with the LPWAN connection to the NOC 118, the FttDP unit 102 is no longer "dead on the pole" when reverse power is unavailable. The operator can inventory the FttDP unit 102, inquire the FttDP unit 102 about startup handshakes, have a provisioning/configuration path into the FttDP unit 102, and/or have a path for alarms to the FttDP unit 102 regardless of the status of the broadband connection and/or power issues at customer premises.

In some situations, CPEs (e.g., CPE 106 and/or CPE 112) can also include a state monitor similar to the state monitor 124. With an LPWAN link to each CPE, troubleshooting capabilities can be greatly enhanced. For example, status information of the CPE can still be acquired over the LPWAN connection regardless of the status of the broadband connection and/or power issues at customer premises.

The network 120 facilitates wireless or wireline communications between the FttDP unit 102 and any other local or remote computer, such as the NOC 118, additional servers, or other devices communicably coupled to the network 120, including those not illustrated in FIG. 1. As illustrated in FIG. 1, the network 120 is depicted as a single network, but may be comprised of more than one network without departing from the scope of this disclosure.

In some implementations, one or more of the illustrated components may be included within network 120 as one or more cloud-based services or operations. The network 120 may be all or a portion of an enterprise or secured network, while in another case, at least a portion of the network 120 may represent a connection to the Internet, a public switched telephone network (PSTN), a data server, a video server, or additional or different networks. In some implementations, a portion of the network 120 may be a virtual private network (VPN). Further, all or a portion of the network 120 can comprise either a wireline or wireless link. Example wireless links may include 802.11ac/ad/af/a/b/g/n, 802.20, WiMax, LTE, and/or any other appropriate wireless link. In other words, the network 120 encompasses any internal or external network, networks, sub-network, or combination thereof, operable to facilitate communications between various computing components, inside and outside the environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

Figure 2:
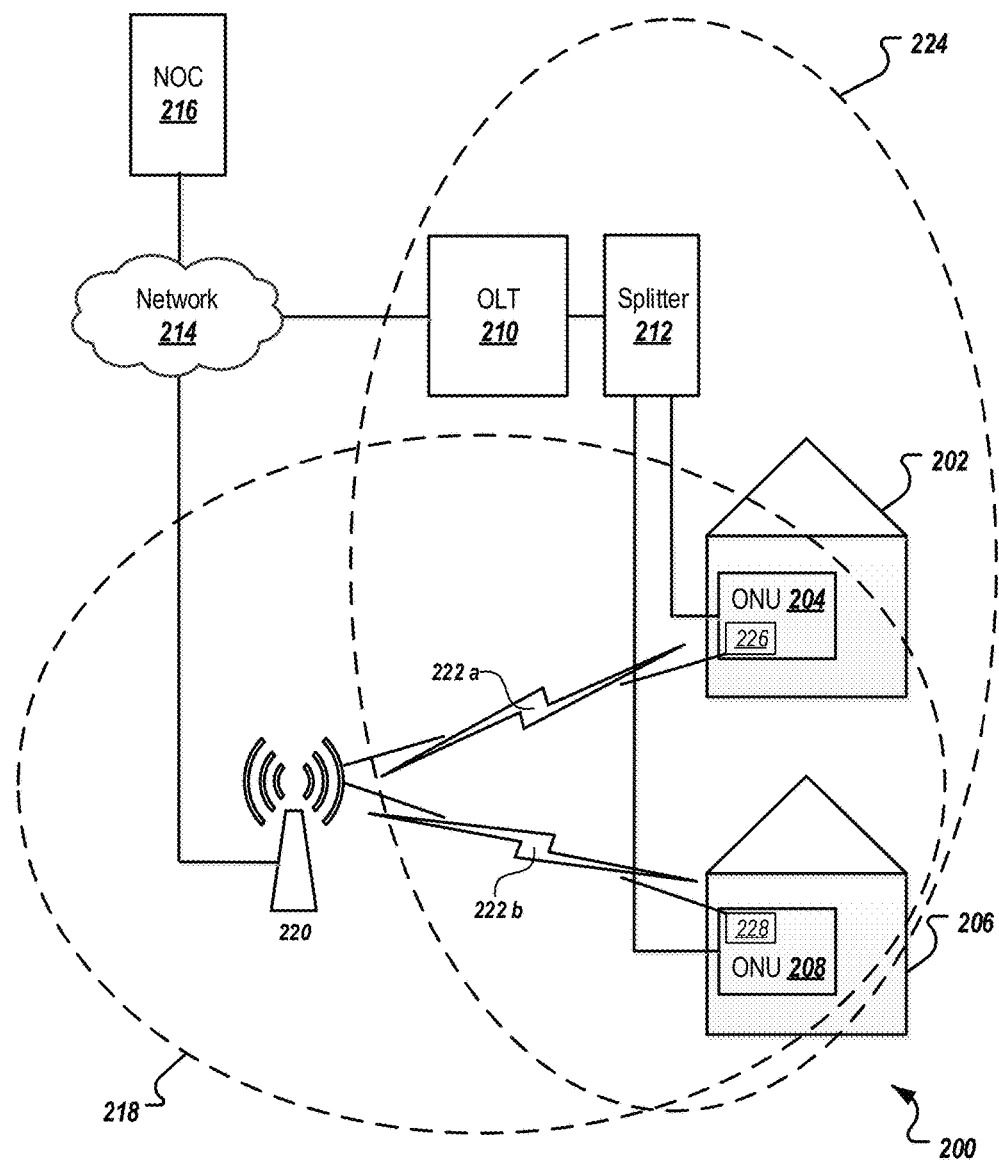
FIG. 2 is a block diagram illustrating another example operating environment for devices having broadband connectivity and a radio link.

FIG. 2 a block diagram illustrating another example operating environment 200 for devices having broadband connectivity and a radio link. As illustrated in FIG. 2, the environment 200 includes a PON 224 that connects users to a network 214. Network 214 may be similar to or different from the network 120 described with regard to the environment 100. In some implementations, the environment 200 may include additional and/or different components not shown in the block diagram, such as one or more active optical networks (AONs), another type of network that provides network services (e.g., ADSL2+, VDSL2), or a combination of these and other technologies. In some implementations, components may also be omitted from the environment 200.

As illustrated, the PON 224 includes an OLT 210 at a service provider's central office (or other location), a splitter 212, an ONU 204 at residential location 202, and an ONU 208 at business location 206. Using a splitter 212, the OLT 210 is coupled to a number of ONUs 204 and 208 (also referred to as optical network terminals (ONTs)), which are located near end users, thereby forming a point-to-multipoint network. For example, in the case of Gigabit Passive Optical Network (GPON), a single OLT port can connect to 64 or more different ONUs through the splitter 212.

Each ONU can include, or otherwise be coupled to, one or more customer-premises equipment (CPE) or subscriber devices (e.g., residential gateway). For example, the ONU 204 is a device that terminates the PON 224 at the customer end, and provides a service connection to a user living in the residential location 202. The ONU 204 terminates optical fiber transmission and can transform incoming optical signals into electrical signals, adapted to subscriber devices. As a result, ONUs can provide network services, for example, to residential location 202 and business location 206, or other forms of communications infrastructure. In some implementations, ONUs can be installed inside residential locations and powered directly from residential locations. In some implementations ONUs can be installed outside residential locations and be reverse powered from residential locations.

As illustrated, the environment 200 also includes a NOC 216 that monitors, controls, and/or manages the ONUs (e.g., ONU 204 and ONU 208) via the network 214 and/or the LPWAN 218. As illustrated, the ONUs can communicate with the NOC 216 via network 214 through the OLT 210 and splitter 212. In addition, the ONUs include a LPWAN component (discussed in more detail in FIG. 4 below) that can communicate with the NOC 216 via the LPWAN 218. The LPWAN 218 includes a base station 220 that can communicate with the NOC 216 via network 214 over, for example, fixed wireline infrastructure (e.g., a radio backhaul link). In addition, the base station 220 can communicate with the ONU 204 over a low-power radio link 222a, and with the ONU 208 over a low-power radio link 222b. In some implementations, the LPWAN 218 can include additional base stations, and/or other components not shown in FIG. 2. The LPWAN connection (e.g., a wireless communications link) between the NOC 216 and the ONUs through the base station 220, independent from the broadband connection through the OLT 210, can expend diagnostic capabilities for the operator.

The OLT 210, as a network distribution element, provides an interface between the PON 224 and the network 214, and serves as the service provider's endpoint for the PON 224. The OLT 210 transmits downstream data traffic to ONUs (e.g., ONUs 204 and 208), and receives upstream data traffic from the ONUs. In some situations, the OLT 210 can also include a LPWAN component (discussed in more detail in FIG. 4 below).

As illustrated, ONUs 204 and 208 include state monitors 226 and 228, respectively. In some implementations, the state monitors 226 and 228 can monitor performance of their respective broadband links. When the performance of the respective broadband links deteriorates, the state monitors 226 and 228 transmit status information of their respective broadband links (e.g., unexpected behavior or traffic patterns) over their respective LPWAN links (e.g., the radio links 222a and/or 222b). In some implementations, the state monitors 226 and 228 can acquire and/or transmit status information of their respective broadband links over the respective LPWAN links upstream in response to receiving a polling command (or other command) over the respective LPWAN links.

In some implementations, the state monitors 226 and 228 can monitor connectivity of their respective broadband links. When the state monitors 226 and 228 detect lack of communication with the OLT 210, the state monitors 226 and 228 transmit status information of their respective ONUs (e.g., ONU 204 and/or ONU 208) over their respective LPWAN links (e.g., the radio links 222a and/or 222b). In some implementations, the state monitors 226 and 228 can acquire and/or transmit status information of their respective ONUs over the respective LPWAN links upstream in response to receiving a polling command (or other command) over the respective LPWAN links. The status information of an ONU can include power outages at the ONU, bad circuit board in the ONU, and other information that can be determined about the ONU.

In some implementations, the state monitor 226 can acquire and/or transmit timeslots information of ONU 204 over the LPWAN link (e.g., the radio link 222a) upstream in response to receiving a polling command (or other command) over the LPWAN link. ONUs that fail to respond to polling commands (or ONUs whose transmitted timeslots do not match their assigned timeslots) can be identified as rogue ONUs. Thus, a service provider can transmit an Emergency Shutdown command over the LPWAN channel to shutdown (or reset) the rogue ONUs. In some implementations, each ONU includes an independent power control circuitry that responds to the Emergency Shutdown command.

In some implementations, the ONU may contain OTDR capabilities. Troubleshooting can be enhanced, for example, by enabling ONU-based OTDR measurements to be remotely obtained, thereby providing a more detailed view of the fiber link than that provided by OLT-based OTDR measurements alone. Existing art has no mechanism to recover ONU-based results, thus making ONU-based OTDR capabilities irrelevant. For example, an OTDR can be implemented at an ONU (e.g., ONU 204). The state monitor 226 can monitor connectivity of the broadband link. When the state monitor 226 detects lack of communication with the OLT 210, the state monitor 226 can instruct the OTDR implemented at ONU 204 to perform an OTDR measurement on the fiber between the splitter 212 and the ONU 204. The OTDR measurement can be used by the ONU 204 to determine the distance to a fault in ONU 204's distribution fiber, should one exist. The state monitor 226 can transmit the distance to a fault information over the LPWAN link (e.g., the radio link 222*a*), or that the fiber looks healthy so that a fiber but in this segment may be ruled out. In some implementations, the state monitor 226 can instruct the OTDR to perform an OTDR measurement, determine the distance to a fault, and/or transmit the distance to a fault information over the LPWAN link upstream in response to receiving a polling command (or other command) over the LPWAN link. With the addition of an LPWAN channel, each ONU can detect the distance to a fault in its distribution fiber (i.e., the fiber between the splitter and the ONU) using ONU-based OTDR measurements and report the findings over the LPWAN channel. Combining the ONU-based OTDR measurements with the OLT-based OTDR measurements, which detect distance to a fault in the feeder fiber (i.e., the fiber between the OLT and the splitter), fiber faults can be remotely detected irrespective of which side of the splitter they are located.

Figure 3:
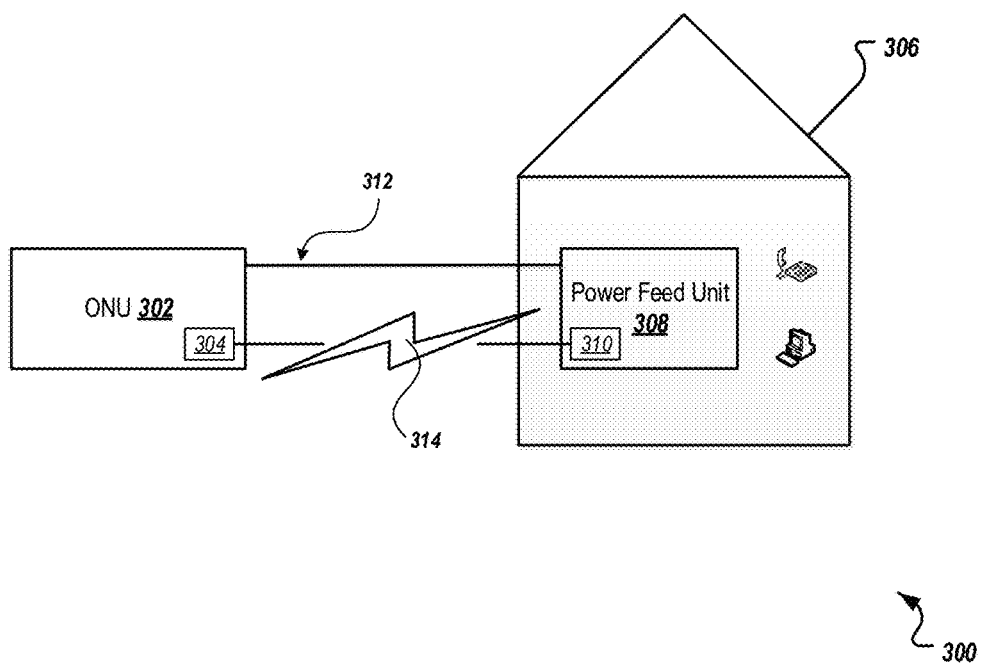
FIG. 3 is a block diagram illustrating an example operating environment for outdoor and indoor devices communicating over a radio link.

FIG. 3 is a block diagram illustrating an example operating environment 300 for outdoor and indoor devices communicating over a radio link, which can be used to facilitate self-installation as previously discussed. As illustrated in FIG. 3, the environment 300 includes an outdoor unit (i.e., ONU 302) and an indoor unit (i.e., power feed unit 308 inside residential locations 306). The power feed unit 308 feeds power to the ONU 302 typically over a single copper twisted pair 312. In some implementations, the environment 300 may include additional and/or different components not shown in the block diagram. For example, the outdoor unit can be located at a Distribution Point Unit (DPU) or on the side of a house. In some implementations, components may also be omitted from the environment 300.

As illustrated, both the ONU 302 and the power feed unit 308 include a state monitor (i.e., 304 and 310, respectively) that can communicate with each other over a low-power radio link 314 (e.g., a LPWAN link). In some implementations, other types of radio communication can be used, such as LTE, Wi-Fi and Bluetooth. The ONU 302 can report its power draw (and/or other status information) to the power feed unit 308 over the low-power radio link 314.

In some implementations, the copper pair 312 is also used for POTS providing a telephone service to a user living in the residential location 306. In one technique to facilitate both POTS and reverse power feed on the same pair, an adapter must be placed in-line with each phone. If a phone is taken off-hook without such an adapter, the reverse power feed could damage the phone. With the power draw information from the outdoor unit (i.e., the ONU 302), the power feed unit can detect such a fault and take action to avoid damaging the phone. For example, the state monitor 304 monitors the power the ONU 302 is drawing from the power feed unit 308 and periodically (or continuously) transmits the power draw information over the low-power radio link 314 to the power feed unit 308. The state monitor 310 of the power feed unit 308 receives the power draw information from the ONU 302 and compares the power draw information with the power output of the power feed unit 308. If the state monitor 310 determines that the power output of the power feed unit 308 exceeds the power drawn of the ONU 302 by a predetermined threshold, the state monitor 310 can instruct the power feed unit 308 to shut down to prevent damaging other devices such as telephones without the requisite adapters.

Figure 4:
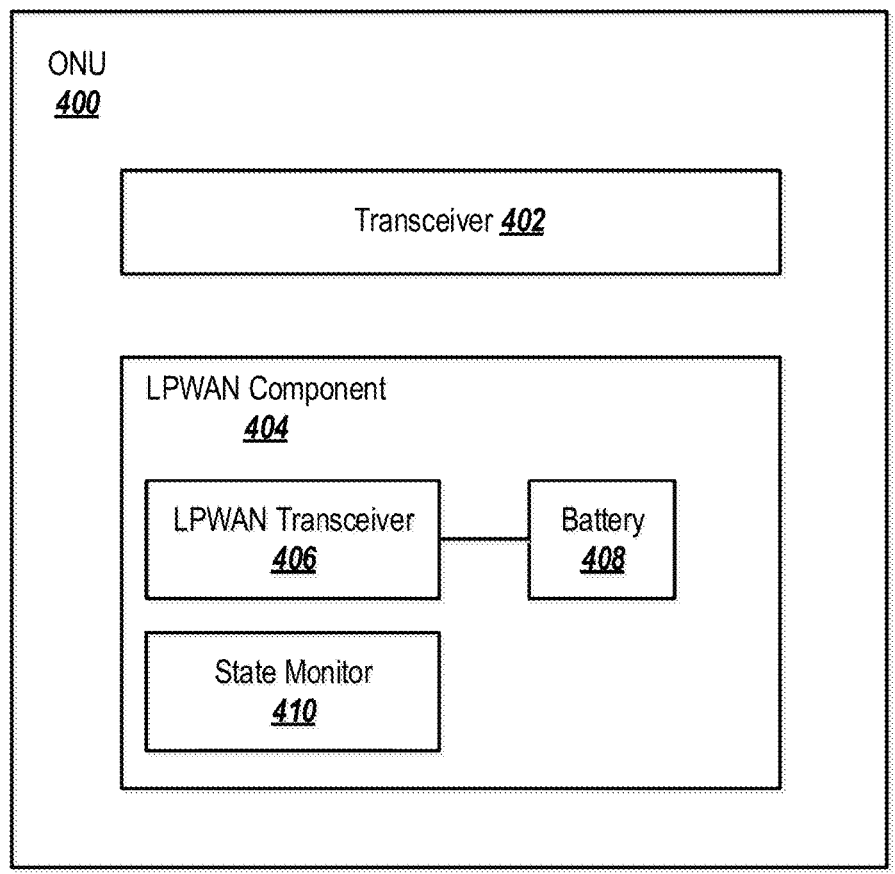
FIG. 4 is a block diagram of an example ONU.

FIG. 4 is a block diagram of an example ONU 400. In some implementations, the ONU 400 may include additional and/or different components, not shown in the block diagram. Components may also be omitted from the ONU 400. The components illustrated in FIG. 4 may be similar to, or different from those described in FIGS. 2 and 3.

As illustrated in FIG. 4, a typical ONU 400 includes a transceiver 402. The transceiver 402 can be configured to transmit and/or receive data streams from ONUs over a fiber optic link (e.g., a broadband link). In some implementations, one or more components of the OLT 400 are integrated in a field-programmable gate array (FPGA).

As illustrated, the ONU 400 includes a LPWAN component 404. The LPWAN component 404 enables the ONU 400 to communicate over a LPWAN link in addition to the optical link enabled by the transceiver 402. The LPWAN component 404 includes a LPWAN transceiver 406, which facilitates transmitting and receiving data over the LPWAN link. In some implementations, the LPWAN component 404 includes a small battery 408 (e.g., a coin cell battery) that powers the LPWAN transceiver 406. The LPWAN component 404 also includes a state monitor 410 that monitors a state of the ONU 400. In some implementations, the state monitor 410 can cause the LPWAN transceiver 406 to transmit data specifying the state of the ONU 400 over the LPWAN link. In some implementations, the state monitor 410 can shut down the ONU 400 in response to an Emergency Shutdown command received by the LPWAN transceiver 406.

The operations performed by the state monitor 410 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The state monitor 410 can also be implemented as special purpose logic circuitry, for example, a FPGA or an application specific integrated circuit (ASIC).

Figure 5:
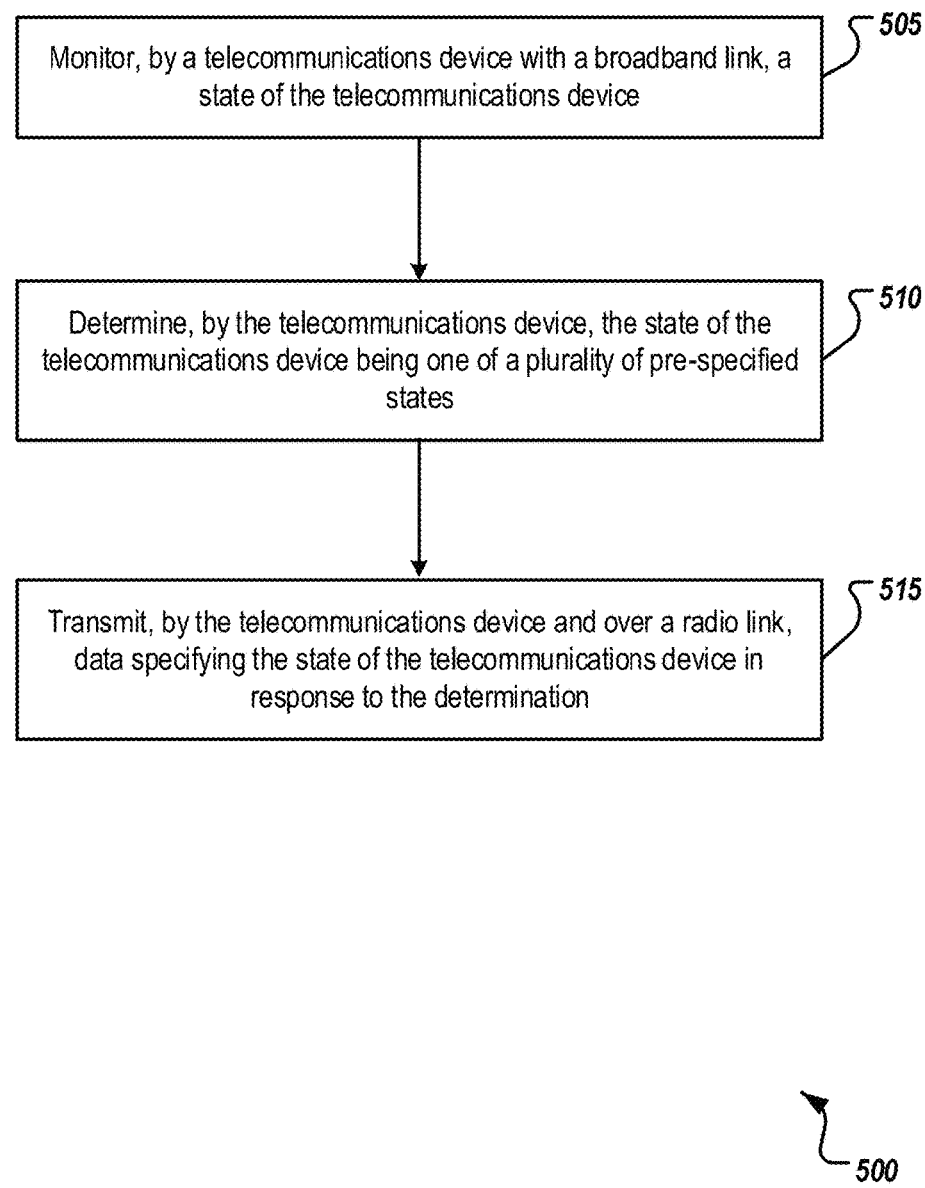
FIG. 5 is a flow chart of an example process for devices with broadband connectivity communicating over a radio link.

FIG. 5 is a flow chart of an example process 500 for devices with broadband connectivity communicating over a radio link. The example process 500 can be performed, for example, by one or more telecommunications devices, such as those described with reference to FIGS. 1-4. The example process 500 can also be implemented as instructions stored on a non-transitory, computer-readable medium that, when executed by one or more telecommunications devices, configures the one or more telecommunications devices to perform and/or cause the one or more telecommunications devices to perform the actions of the example process 500.

A state of a first telecommunications device is monitored by the first telecommunications device (505). In some implementations, the first telecommunications device includes a first transceiver that communicates over a broadband link. In some implementations, the broadband link is used for data communication. In some implementations, the radio link is used for data communication. In some implementations, priority of the two links for data communication can be specified by, for example, a network operator. In some implementations, the broadband link is a fiber-optic link. In some implementations, the first telecommunications device is a reverse powered device that obtains power from a customer premises. In some implementations, the first telecommunications device includes a state monitor, which includes one or more processes that monitor the state of the first telecommunications device and perform corresponding operations in response to different monitored states. In some implementations, the state of the first telecommunications device includes a state of the broadband link (e.g., communication over the broadband channel is disrupted). The one or more processes can be implemented in dedicated hardware state machine, computer processor, and/or FPGA. In some implementations, the first telecommunications device can be an FttDP unit, a CPE, an ONU, or an OLT.

The state of the first telecommunications device is determined, by the first telecommunications device, to match one of a plurality of pre-specified states (510). In some implementations, the plurality of pre-specified states include at least one of a power outage at the first telecommunications device, unexpected traffic pattern on the broadband link, impeded communication over the broadband link, or polled by a second telecommunications device over the radio link. In some implementations, the second telecommunications device can be an OLT or a NOC. In some implementations, when the first telecommunications device is a reverse powered device, the plurality of pre-specified states include a power draw by the first telecommunications device exceeds a pre-specified threshold.

In response to the determination, data specifying the state of the first telecommunications device is transmitted by the first telecommunications device and over a radio link (515). In some implementations, the first telecommunications device includes a second transceiver that communicates over the radio link. In some implementations, the radio link is a LPWAN link. In some implementations, the transmitted data over the radio link includes at least one of diagnostic information, performance monitoring information, troubleshooting information, maintenance information, inventory information, information associated with the broadband link, or self-installation capability for the first telecommunications device. In some implementations, the first telecommunications device includes a small battery powering at least a portion of the first telecommunications device when the first telecommunications device is not supplied with external power.

The example process 500 shown in FIG. 5 can be modified or reconfigured to include additional, fewer, or different actions (not shown in FIG. 5), which can be performed in the order shown or in a different order. For example, the first telecommunications device can monitor DC power it draws from a power feed unit that is external to the first telecommunications device and transmit data specifying the DC power over the radio link to the power feed unit.

In some implementation, when the first telecommunications device is an ONU communicating with an OLT (e.g., the second telecommunications device) on a PON over a fiber-optic link, the example process 500 can include actions of performing, by the ONU, an OTDR measurement of fiber connected between the ONU and the OLT or a splitter, and transmitting, by the ONU and over the radio link, the OTDR measurement.

In some implementation, when the second telecommunications device is a NOC, the example process 500 can include actions of polling, by the NOC, the first telecommunications device for status information over the radio link when the NOC detects an error, upgrading firmware or provisioning of the first telecommunications device over the radio link, and/or provisioning the first telecommunications device over the radio link.

In some implementation, when the first telecommunications device is an ONU communicating with an OLT on a PON over a fiber-optic link, the example process 500 can include actions of polling, by the NOC or the OLT, the ONU over the radio link for an OTDR measurement of fiber connected between the ONU and the OLT or a splitter, and determining, based on the OTDR measurement, a location of a fault on the fiber connected between the ONU and the OLT or the splitter. In some implementations, when there are one or more ONUs on the PON, the example process 500 can include actions of polling, by the NOC, the OLT for time slots assigned to each ONU, polling, by the NOC, each ONU for time slots that the particular ONU is using to transmit data, identifying, by the NOC, a rogue ONU from among the polled ONUs when there is a mismatch between the time slots assigned to each ONU by the OLT and time slots being used to transmit data, and in response to the identification, remotely disabling transmission by the rogue ONU using the radio link. In some implementations, when there are one or more ONUs on the PON, the example process 500 can include actions of polling, by the OLT, each ONU for time slots that the particular ONU is using to transmit data, identifying, by the OLT, a rogue ONU from among the polled ONUs when there is a mismatch between the time slots assigned to each ONU by the OLT and time slots being used to transmit data, and in response to the identification, remotely disabling transmission by the rogue ONU using the radio link.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A telecommunications device comprising:
   a first transceiver configured to communicate over a broadband link;
   a second transceiver configured to communicate over a radio link that is a different communications link than the broadband link; and
   a state monitor, including one or more processes that:
   monitor a state of the telecommunications device; and in response to the state of the telecommunications device being a power outage state that is disrupting communications by the first transceiver, transmit, using the second transceiver, data specifying the state of the telecommunications device over the radio link.

2. The telecommunications device of claim 1, wherein the transmitted data over the radio link comprises at least one of diagnostic information, performance monitoring information, troubleshooting information, maintenance information, inventory information, information associated with the broadband link, or self-installation capability for the telecommunications device.

3. The telecommunications device of claim 1, wherein the broadband link is a fiber-optic link and the radio link is a Low-Power Wide-Area Network (LPWAN) link.

4. The telecommunications device of claim 1, wherein the one or more processes further monitor DC power that the telecommunications device is drawing from a power feed unit that is external to the telecommunications device, and transmit data specifying the DC power over the radio link to the power feed unit.

5. The telecommunications device of claim 1, further comprising a battery that powers at least a portion of the telecommunications device when the telecommunications device is not supplied with external power, wherein the portion of the telecommunications device includes the second transceiver.

6. The telecommunications device of claim 1, wherein the telecommunications device is a reverse powered device that obtains power from a customer premises.

7. The telecommunications device of claim 1, wherein the telecommunications device is an Optical Network Unit (ONU) on a Passive Optical Network (PON), and the ONU communicates with an Optical Line Termination (OLT) on the PON over the broadband link, the one or more processes further:
perform an Optical Time-Domain Reflectometer (OTDR) measurement of fiber connected between the ONU and the OLT or a splitter; and
transmit, using the second transceiver, the OTDR measurement over the radio link.

8. A method, comprising:
monitoring, by a first telecommunications device comprising a transceiver configured to communicate over a broadband link, a state of the first telecommunications device;
determining, by the first telecommunications device, that the state of the first telecommunications device is a power outage state that is disrupting communications by the transceiver; and
transmitting, by the first telecommunications device and over a radio link that is a different communications link than the broadband link, data specifying the state of the first telecommunications device in response to the determination.

9. The method of claim 8, wherein the transmitted data over the radio link comprises at least one of diagnostic information, performance monitoring information, troubleshooting information, maintenance information, inventory information, information associated with the broadband link, or self-installation capability for the first telecommunications device.

10. The method of claim 8, wherein the broadband link is a fiber-optic link and the radio link is a Low-Power Wide-Area Network (LPWAN) link.

11. The method of claim 8, further comprising:
monitoring DC power that the first telecommunications device is drawing from a power feed unit that is external to the first telecommunications device; and
transmitting data specifying the DC power over the radio link to the power feed unit.

12. The method of claim 8, further comprising powering at least a portion of the first telecommunications device with a battery installed in the first telecommunications device when the first telecommunications device is not supplied with external power.

13. The method of claim 8, wherein the first telecommunications device is a reverse powered device that obtains power from a customer premises.

14. The method of claim 8, wherein the first telecommunications device is an Optical Network Unit (ONU) on a Passive Optical Network (PON), and wherein the ONU communicates with an Optical Line Termination (OLT) on the PON over the broadband link, further comprising:
performing, by the ONU, an Optical Time-Domain Reflectometer (OTDR) measurement of fiber connected between the ONU and the OLT or a splitter; and
transmitting, by the ONU and over the radio link, the OTDR measurement.

15. A system comprising:
a first telecommunications device comprising a first transceiver that is configured to communicate over a broadband link and a second transceiver that is configured to communicate over a radio link that is a different communications link than the broadband link; and
a base station comprising a third transceiver that is configured to communicate over the radio link, wherein:
the first telecommunications device further comprises a state monitor, including one or more processes, that:
monitor a state of the first telecommunications device; and
in response to the state of the first telecommunications device being a power outage state that is disrupting communications by the first transceiver or polled by a Network Operations Center (NOC), transmit, using the second transceiver, data specifying the state of the first telecommunications device over the radio link.

16. The system of claim 15, wherein the NOC is configured to perform at least one of:
polling the first telecommunications device for status information over the radio link when the NOC detects an error,
upgrading firmware of the first telecommunications device over the radio link, or provisioning the first telecommunications device over the radio link.

17. The system of claim 15, wherein the transmitted data, by the first telecommunications device, over the radio link comprises at least one of diagnostic information, performance monitoring information, troubleshooting information, maintenance information, inventory information, information associated with the broadband link, or self-installation capability for the first telecommunications device.

18. The system of claim 15, wherein the broadband link is a fiber-optic link and the radio link is a Low-Power Wide-Area Network (LPWAN) link.

19. The system of claim 15, wherein the first telecommunications device is an Optical Network Unit (ONU) on a Passive Optical Network (PON), and wherein the ONU communicates with an Optical Line Termination (OLT) on the PON over the broadband link.

20. The system of claim 19, further comprising a NOC, wherein the NOC is configured to:
- poll the ONU over the radio link for an OTDR measurement of fiber connected between the ONU and the OLT or a splitter; and
- determine, based on the OTDR measurement, a location of a fault on the fiber connected between the ONU and the OLT or the splitter.

21. The system of claim 19, further comprising one or more ONUs, wherein the OLT is configured to:
- poll each ONU for time slots that the particular ONU is using to transmit data;
- identify a rogue ONU from among the polled ONUs when there is a mismatch between time slots assigned to each ONU by the OLT and time slots being used to transmit data; and
- in response to the identification, remotely disable transmission by the rogue ONU using the radio link.

22. The telecommunications device of claim 1, wherein the state monitor is powered by a battery to monitor the state of the telecommunications device.

\* \* \* \* \*